(12) United States Patent
Currelly et al.

(10) Patent No.: US 6,661,211 B1
(45) Date of Patent: Dec. 9, 2003

(54) QUICK-START DC-DC CONVERTER CIRCUIT AND METHOD

(75) Inventors: Tom Currelly, North Vancouver (CA); Randy Law, Surrey (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 10/178,226

(22) Filed: Jun. 25, 2002

(51) Int. Cl.[7] .................................................. G05F 1/40
(52) U.S. Cl. ...................................... 323/268; 323/901
(58) Field of Search ................................ 323/268–272, 323/901

(56) References Cited

U.S. PATENT DOCUMENTS

| | | | | |
|---|---|---|---|---|
| 5,512,814 A | | 4/1996 | Allman | 323/267 |
| 5,629,608 A | * | 5/1997 | Budelman | 323/268 |
| 5,705,919 A | * | 1/1998 | Wilcox | 323/282 |
| 6,031,362 A | | 2/2000 | Bradley | 323/269 |
| 6,229,289 B1 | * | 5/2001 | Piovaccari et al. | 323/268 |
| 6,288,523 B2 | | 9/2001 | Antoszkiewicz | 323/267 |

* cited by examiner

*Primary Examiner*—Shawn Riley
(74) *Attorney, Agent, or Firm*—Jim Zegeer

(57) ABSTRACT

A quick-starting low-voltage DC power supply circuit has a switch mode DC to DC converter connected to a DC supply source. A low-dropout-regulator (LDO) connected in parallel with the switch-mode DC to DC converter, and a diode is connected in series with the output of the low-dropout-regulator connecting the output of the low-dropout-regulator to the output of the switch-mode DC to DC converter. The arrangement is such that the start-up output voltage of the circuit is the output voltage of the low-dropout-regulator and the long-term output voltage of the circuit is supplied by the switch-mode DC to DC converter output.

5 Claims, 3 Drawing Sheets

QUICK-START DC-DC CONVERTER CIRCUIT AND METHOD

The present invention relates to the problem of quickly supplying power to low-voltage integrated circuits.

BACKGROUND OF THE INVENTION

Referring to FIG. 1, one type of prior art DC power supply is a switch-mode DC to DC converter, hereinafter referred to as a switch-mode power supply (SMPS). Internally, the SMPS comprises a pulse width modulator, energy storage elements (e.g. capacitors and/or inductors), drive and control circuits. In operation, an input (or supply) voltage and a reference voltage are supplied to the SMPS, which provides an output voltage under regulation of the control circuit and depending upon the reference voltage. The control circuit compares the reference voltage to the output voltage in order to affect the output of the pulse width modulator, which controls the amount of energy stored in the energy storage elements via the drive circuit. Output power is supplied from the energy storage elements. Advantages of SMPS include the ability to step up the input voltage and to reach an efficiency of 90% or greater, which remains constant over a wide range of input voltages.

Referring to FIG. 2, another type of prior art DC power supply is a linear regulator. The linear supply includes a linear regulating element, such as a MOS transistor, under the control of a control circuit, which compares the output voltage to a supplied reference voltage to regulate the output. An example of a linear voltage regulator is a low dropout (LDO) regulator, which has an advantage of requiring small input/output (I/O) voltage differential (also referred to as headroom) to achieve full regulation.

U.S. Pat. No. 5,512,814 issued to Allman on Apr. 30, 1996 entitled VOLTAGE REGULATOR INCORPORATING CONFIGURABLE FEEDBACK AND SOURCE FOLLOWER OUTPUTS discloses a voltage regulator comprising first and second operational amplifiers connected in parallel as part of the control circuitry of the regulator. The second amplifier provides additional current during startup to the first amplifier, which is slew-rate limited, thereby charging the load capacitance more quickly. The second amplifier is biased at a reference voltage that is about 5% less than that of the first amplifier, such that the second amplifier is effectively turned off after startup. (See FIG. 2 and text at column 4, lines 15–55, and column 5, lines 53–57).

The present invention is novel and inventive over U.S. Pat. No. 5,512,814 because of the difference in the types of regulators being used. Particularly, the patent has the startup aiding means (parallel amplifiers) in the control circuitry rather than a separate and independent regulator (e.g. LDO) with different characteristics than the primary regulator (SMPS).

U.S. Pat. No. 6,031,362 issued to Bradley on Feb. 29, 2000 entitled METHOD AND APPARATUS FOR FEEDBACK CONTROL OF SWITCH MODE POWER SUPPLY OUTPUT TO LINEAR REGULATORS discloses a Switch Mode Power Supply (SMPS) that is used as the input voltage to subsequent Low Drop Out (LDO) linear voltage regulators. A multiplexer and Analog to Digital Converter (ADC) are used to successively sample the output voltages of the parallel LDO regulators. The output voltage of the SMPS, and thus the input of the LDO regulators, is reduced to the minimum value that retains full performance of the LDO regulators. Operating each LDO regulator at full regulation ensures full performance of the LDO regulators. Minimizing the input voltage to the LDO regulators maximizes the efficiency of the total power supply. When integrated into a battery powered cellular phone, the invention maximizes efficiency thereby maximizing telephone talk time and standby time. This patent discloses a series connection of a SMPS and LDO regulators which are so connected to achieve a different affect than the present invention. That is, the patent seeks to achieve a high-efficiency power supply. The present invention is distinguishable over this patent by at least its parallel arrangement of the SMPS and the LDO regulator which are decoupled by a rectifying element.

With regard to prior art U.S. Pat. Nos. 5,512,814 and 6,031,362, a problem with SMPS is that they take a long time to ramp up to full voltage compared to other types of regulators, e.g. linear voltage regulators. A problem with linear regulators is that they are inefficient in comparison to SMPS. In fact, the efficiency of a linear regulator decreases in proportion to increases in input voltage.

In view of the advantages and disadvantages of both types of power supplies, an object of the invention is to provide a power supply with the efficiency of the SMPS and the quick ramp-up time of the LDO regulator, without the disadvantages of either.

U.S. Pat. No. 6,288,523 issued to Antoszkiewicz (Alcatel) on Sep. 11, 2001 and entitled PRECISE RAIL TRACKING METHOD FOR POWERING DUAL VOLTAGE INTEGRATED CIRCUITS. The patent discloses a rail tracking supply and method for providing precise tracking of voltage levels to a dual supply voltage IC. A switch-mode DC-DC voltage regulator is used to derive the lower of the two voltage levels from the higher level. The switch-mode regulator employs a pulse width modulator (PWM) to derive the lower voltage level. A separate supply source is utilized to power the PWM and the timing of the supply voltage is such that the PWM has reached steady state before the higher voltage level is provided to the regulator. This patent discloses (particularly in FIG. 3) a switch-mode-power supply (SMPS) in parallel with a circuit that is equivalent to a low dropout voltage (LDO) regulator. The present invention improves upon this arrangement by including a rectifier between the two parallel connected supplies, thereby providing back-drive protection to the LDO and ensuring that the LDO does not provide power after the SMPS has reached its steady state voltage. Also, the LDO of U.S. Pat. No. 6,288,523 does not have any inherent current limiting to protect against shorting of the low-voltage (core) supply to ground.

With regard to the solution disclosed in U.S. Pat. No. 6,288,523, many IC's, most notably microprocessors, ASIC's and field programmable gate arrays (FPGA's), require two voltages, one low voltage for the core and a higher voltage for the input/output. Often the former is generated, using a SMPS, from the latter. However, SMPS's are slow to start, often requiring a substantial input-output differential. If the core voltage has hardly started (or perhaps not started at all) rising by the time the I/O voltage is near or at its final value, there can be a very large current spike in the I/O. The problem is especially prevalent for FPGA's because a powered I/O without a powered core can yield paths of direct short from I/O supply to ground via unconfigured transistors in the I/O region. This current spike may be sufficient to cause current-limit of the I/O voltage supply, thus ensuring that the entire unit will never properly start. This invention gets around that problem by pulling up the core voltage "early".

BRIEF DESCRIPTION OF THE PRESENT INVENTION

The quick-start circuit incorporates a low-dropout-regulator (LDO) used in parallel with a switch-mode DC to DC converter. As the latter will not start fast enough, or perhaps more accurately described, at a low enough Vin, this invention uses the LDO to pull up the rail early while the switch-mode DC-DC converter circuitry is ramping up. The LDO requires only a very small input-to-output differential (what is called "headroom") and thus is able to deliver current to the 1.8V rail before the switcher, which requires a comparatively high headroom.

Obviously, once the circuitry is fully powered up, the invention does not want the LDO to deliver current to the load at all. Hence it is set to produce an output of 1.7V, i.e. very slightly below the output of the 1.8V switcher. Notice the schottky diode in series with the LDO output to ensure that the (higher voltage) 1.8V cannot back-drive the (lower voltage) 1.7V.

The invention provides a quick-starting low-voltage DC power supply circuit comprising a switch-mode DC to DC converter connected to a DC supply source, a low-dropout-regulator (LDO) connected in parallel with the switch-mode DC to DC converter, and a diode in series with the output of the low-dropout-regulator connecting the output of the low-dropout-regulator to the output of the switch-mode DC to DC converter, whereby the start-up output voltage of the circuit is the output voltage of the low-dropout-regulator and the long-term output voltage of the circuit is supplied to the switch-mode DC to DC converter output.

The invention is also directed to a method of quickly supplying low-voltage power to the DC power rail of electronic systems by providing a first low-voltage source which is connected to a power rail for bringing up to near a desired voltage level with a fast startup converter circuit and constituting a less robust source, providing a switch-mode direct current-to-direct current DC converter having an output connected to the power rail, the switch-mode direct current-to-direct current converter having a startup time which is greater than the startup time of the first power supply and constituting a robust source, and blocking flow of energy from the robust source to the less robust source when said robust source is up to said desired voltage level.

BRIEF DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1:
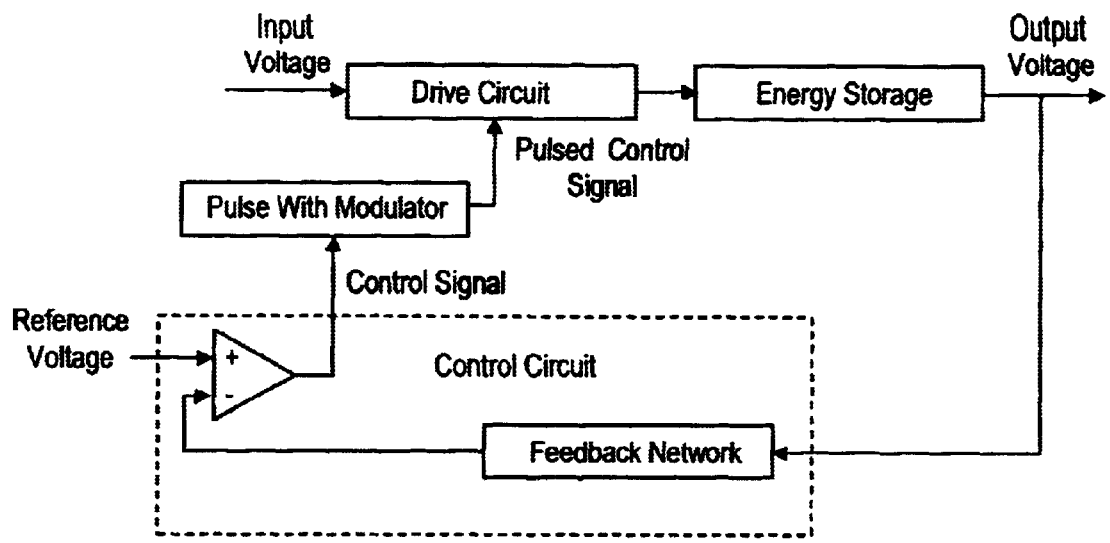
FIG. 1 is one type prior art DC power supply utilizing the switch-mode DC-DC converter.
Figure 2:
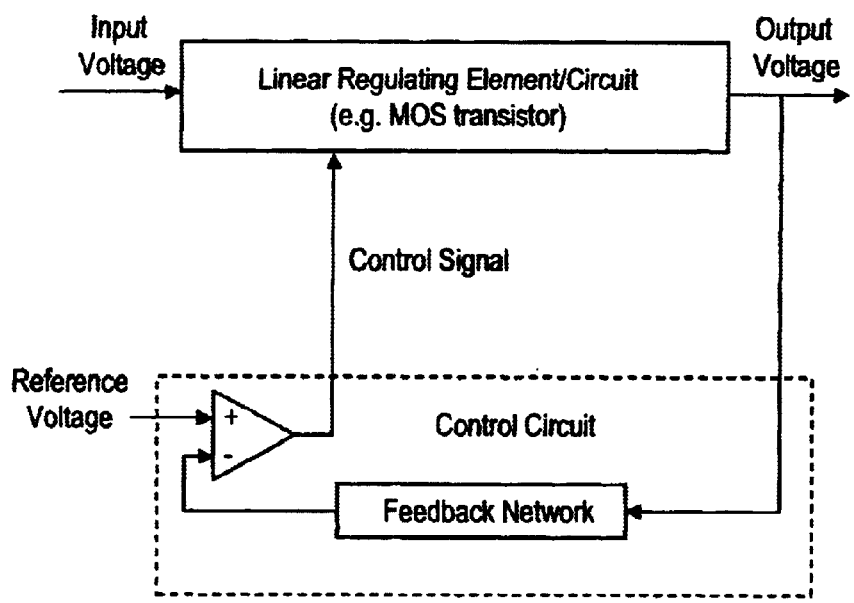
FIG. 2 is another type of prior art DC power supply using a linear regulator.
Figure 3:
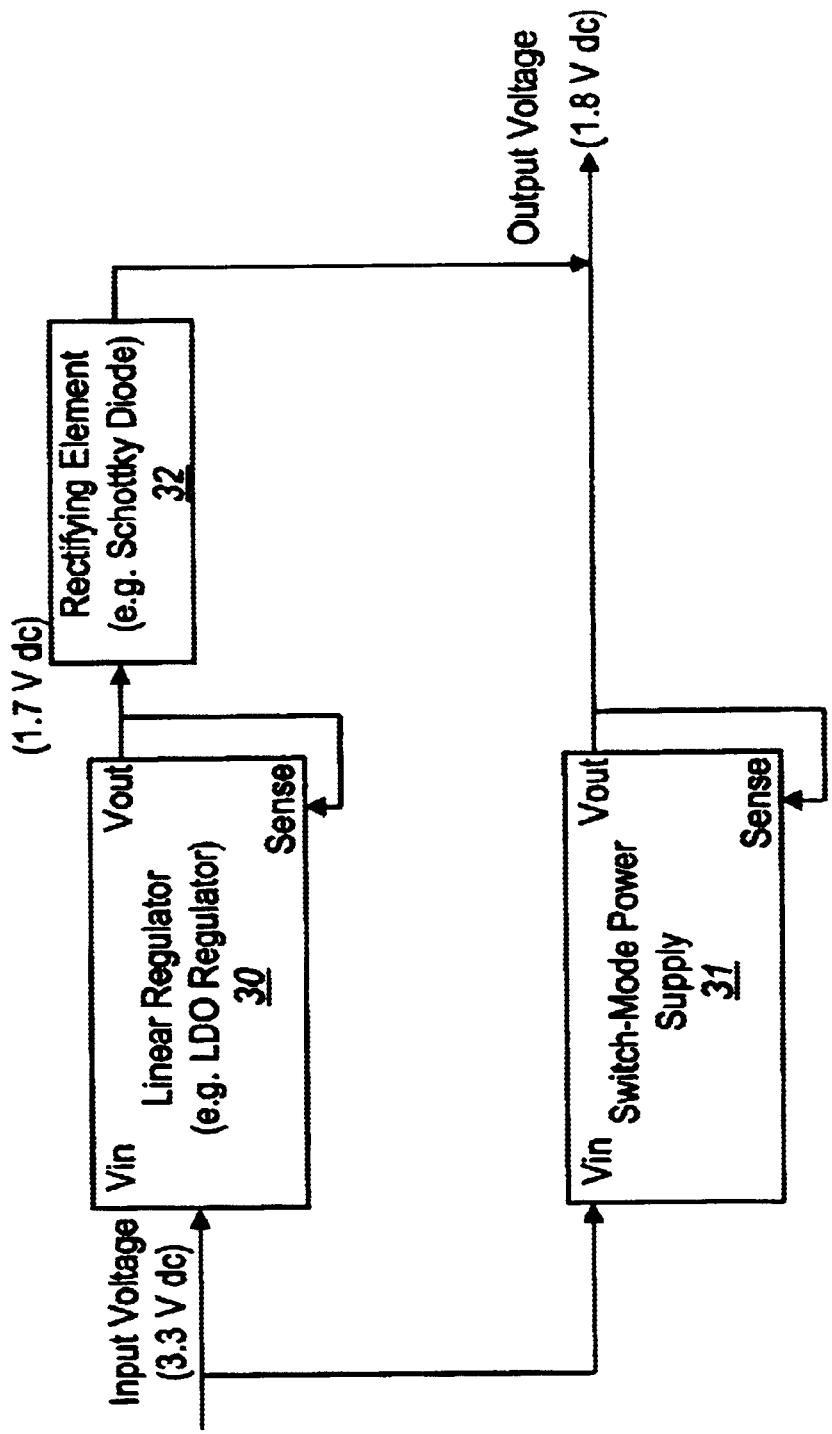
FIG. 3 is a block diagram of a quick-start, low-voltage power supply incorporating the invention.

Referring to FIG. 3, according to the invention, a linear voltage regulator 30, in the form of a low-dropout-regulator (LDO), is connected in parallel with a switch-mode power supply (SMPS) 31. As the latter will not start fast enough, or perhaps more accurately described, at a low enough Vin, the LDO is used to pull up the power rail early while the circuitry is ramping up. The LDO requires only a very small input-to-output differential (referred to as "headroom") and thus is able to deliver current to the 1.8V rail before the SMPS, which requires a comparatively high amount of headroom. Since the SMPS is more efficient, it is preferred that only the SMPS provides power once the output voltage has ramped up to its full value. Hence the LDO is set to produce an output of 1.7V, which is slightly below the output of the 1.8V SMPS (set by reference voltage 2), and coupled to the output of the SMPS with a rectifying element. A schottky diode 32 in series with the LDO output provides the rectification to ensure that the (higher voltage) 1.8V cannot back-drive the (lower voltage) 1.7V. The schottky diode 32 is used because of its low forward voltage drop, approximately 0.3 volts depending on the current flow, to enable the power rail to be ramped up to as close to the final voltage of 1.8 volts as possible, while providing the desired back-drive protection.

Figure 4:
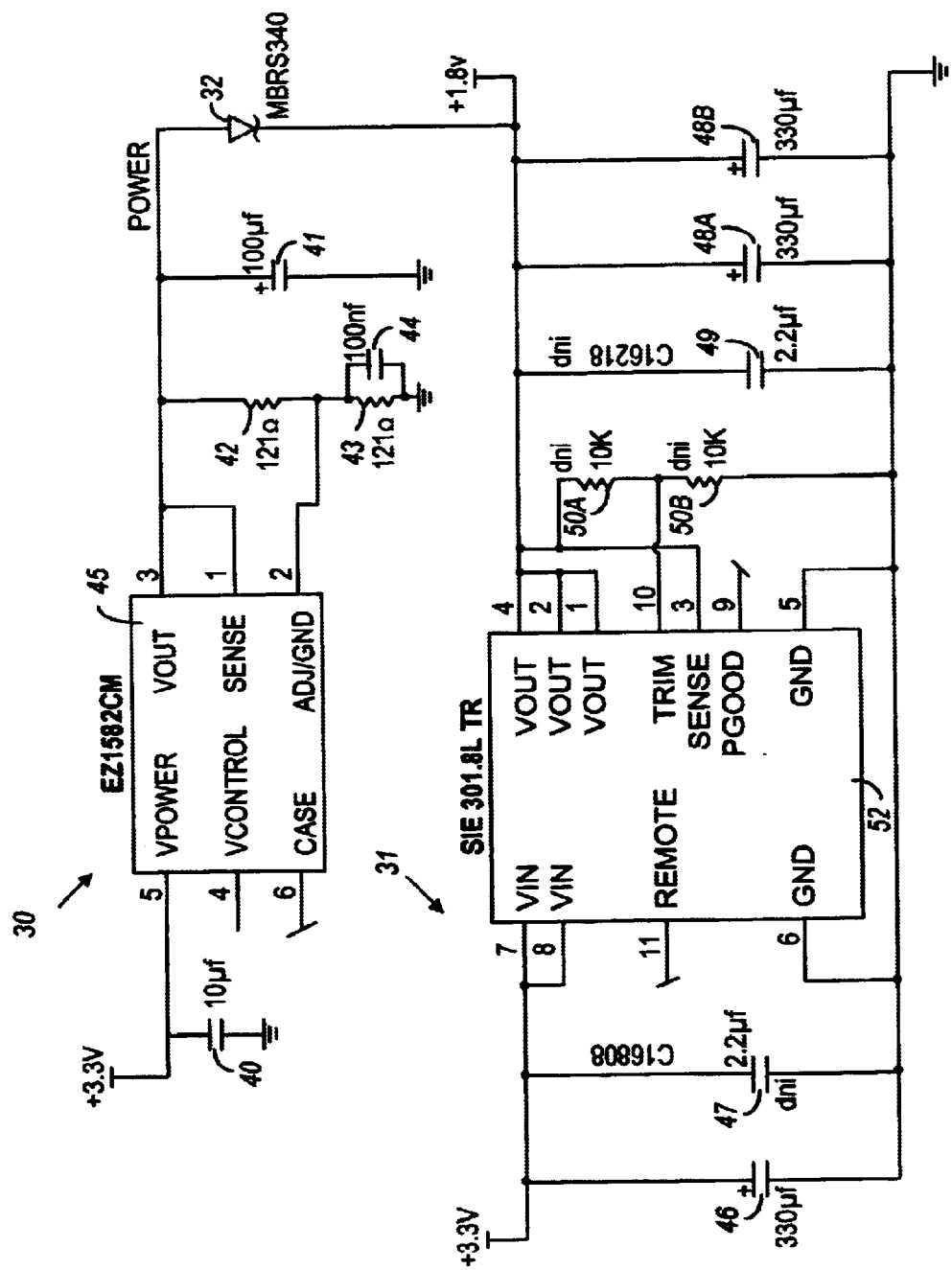
FIG. 4 is a detailed schematic diagram of a quick-starting, low-voltage power supply incorporating the invention.

Referring now to the detailed schematic of FIG. 4, there is a 10 uF input capacitor 40 and 100 uF output capacitor 41, used for bulk storage and stabilization. A pair 42, 43 of 121 ohm resistors provides a voltage divider to divide down the output voltage to the LDO 45 reference voltage. There is also a 100nF capacitor 44 in the divider to clean up any noise. Note that the EZ1582 has both a +5V input to "Control" and +3.3V input to "power". This is the manufacturer's way of providing a LDO with low headroom which is unconditionally stable. For ease of illustration, we have shown one input from +3.3V and disregarded the other completely. The MBRS340 is the output schottky rectifier 32 mentioned above to prevent back-drive.

The input side of the switch-mode portion 31 of the circuitry incorporates a switch-mode converter 52 (SIE301.8LTR) having a 330 uF electrolytic capacitor 46, used for bulk storage and stabilization, and a 2.2 uF ceramic capacitor 47 used for high-frequency noise cleanup. The output side has two 330 uF electrolytic capacitors 48A, 48B, used for bulk storage and stabilization, and a 2.2 uF ceramic capacitor 49 used for high-frequency noise cleanup. A resistive divider (two 10K resistors 50A, 50B) is provided from the Sense pin to Trim pin to facilitate fine-trim of the output voltage should it ever be necessary. Notice that these two resistors are shown in "dni" (do not install) as the circuit presently does not require any trim.

Thus, there has been provided a quick-start circuit incorporating a low-dropout-regulator (LDO) 30 connected in parallel with the switch-mode DC to DC converter 31. As the latter will not start fast enough, at a low enough Vin, the LDO is used to pull up the rail early while the switch-mode converter circuitry is ramping up. The LDO requires only a very small input-to-output differential (what the art calls "headroom") and thus is able to deliver current to the 1.8V rail before the switcher (the switch-mode DC-DC converter) which requires a comparatively high headroom. Of course, once the circuit is fully powered up, it is not desirable to have the LDO deliver current to the load as it has neither the current capability nor the thermal capability to handle the long term powering. Thus, the output of the regulator is 1.7V, i.e. very slightly below the output of the 1.8V switch-mode converter. The schottky diode in series with the LDO output ensures that the higher voltage (1.8V) cannot back-drive the lower voltage (1.7V).

While the invention has been described in relation to preferred embodiments of the invention, it will be appreciated that other embodiments, adaptations and modifications of the invention will be apparent to those skilled in the art.

What is claimed is:

1. A quick-starting low-voltage DC power supply circuit comprising in combination:

a switch-mode DC to DC converter connected to a DC supply source, a low-dropout-regulator (LDO) connected in parallel with said switch-mode DC to DC converter, and a diode in series with the output of said low-dropout-regulator connecting said output of said low-dropout-regulator to the output of said switch-mode DC to DC converter, whereby the start-up output voltage of said circuit is the output voltage of said low-dropout-regulator and the long term output voltage of said circuit is supplied to said switch-mode DC to DC converter output.

2. A power supply for supplying a regulated output voltage comprising:

a switch-mode direct current-to-direct current (DC to DC) converter having an output and adapted to be connected to a source of direct current DC power, a rectifying element having an anode and a cathode, said cathode being connected to the output of the switch-mode DC to DC converter; and a linear regulator having an output coupled to said anode of said rectifying element, a supply input for connecting to said DC power supply, said linear regulator having a turn-on speed which is greater than that of said switch-mode DC-DC converter and the output of the said linear regulator has a lower voltage than that of the switch-mode DC-DC converter, and said rectifying element blocking flow of any energy from said switch-mode DC-DC converter to said linear regulator.

3. The invention defined in claim 2 wherein said linear regulator is a low dropout regulator (LDO).

4. The invention defined in claim 3 wherein said rectifying element is a schottky diode.

5. A method of quickly supplying low-voltage power to a power rail comprising providing a first low-voltage source which is connected to said power rail for bringing up to near a desired voltage level with a fast startup converter circuit and constituting a less robust source, providing a switch-mode direct current-to-direct current DC converter having an output connected to said power rail, said switch-mode direct current-to-direct current converter having a startup time which is greater than the startup time of said first power supply and constituting a robust source, and blocking flow of energy from said robust source to said less robust source when said robust source is up to said desired voltage level.

* * * * *